United States Patent [19]

Oxley et al.

[11] Patent Number: 4,993,462

[45] Date of Patent: Feb. 19, 1991

[54] FLUID FLOW CONTROL ARRANGEMENT

[75] Inventors: Michael D. Oxley, Slough; Peter N. Wiseman, Maidenhead, both of United Kingdom

[73] Assignee: Graviner Limited, Derby, England

[21] Appl. No.: 370,637

[22] Filed: Jun. 23, 1989

[30] Foreign Application Priority Data

Jun. 25, 1988 [GB] United Kingdom ................ 8815165

[51] Int. Cl.⁵ .............................................. B01J 7/00
[52] U.S. Cl. ..................................... 141/346; 141/18; 128/202.26; 422/126; 422/166
[58] Field of Search .................... 141/4, 18, 19, 46, 47, 141/49, 51, 94, 311 R, 351, 346-349, 353-355, 360-362, 382-387, 63, 92; 422/164-166, 126; 128/202.26; 102/530

[56] References Cited

U.S. PATENT DOCUMENTS

| | | | |
|---|---|---|---|
| 2,695,743 | 11/1954 | Wetherby-Williams | 141/40 X |
| 2,779,358 | 1/1957 | Fechheimer et al. | 141/92 |
| 3,024,044 | 3/1962 | Benevento | 141/4 X |
| 3,151,640 | 10/1964 | Teston | 141/354 X |
| 3,584,661 | 6/1971 | Riesenberg | 141/63 X |
| 3,797,854 | 3/1974 | Poole et al. | 280/741 |
| 3,833,029 | 9/1974 | Munn | 141/4 |
| 3,861,312 | 1/1975 | Held et al. | 102/208 |
| 3,911,974 | 10/1975 | Kuykendall | 141/94 |
| 3,913,604 | 10/1975 | Hanson et al. | 137/68.1 |
| 4,087,591 | 5/1978 | Bowers et al. | 429/29 |
| 4,111,661 | 9/1978 | Rothenberger | 422/165 X |
| 4,115,069 | 9/1978 | Martin et al. | 422/166 X |
| 4,138,218 | 2/1979 | McClure, III | 422/164 X |
| 4,197,213 | 4/1980 | Pietz et al. | 422/164 X |
| 4,293,009 | 10/1981 | Fulton | 141/311 R |
| 4,372,343 | 2/1983 | Trinkwalder | 137/614.2 |
| 4,427,635 | 1/1984 | Hahn | 422/165 X |
| 4,623,520 | 11/1986 | Robinet | 422/126 |
| 4,628,970 | 12/1986 | Vasella | 141/18 |
| 4,768,543 | 9/1988 | Wienke et al. | 137/240 |
| 4,884,410 | 12/1989 | Bell et al. | 141/311 R |

FOREIGN PATENT DOCUMENTS

| | | |
|---|---|---|
| 3013102 | 10/1980 | Fed. Rep. of Germany . |
| 3622527 | 5/1987 | Fed. Rep. of Germany . |
| 3604775 | 8/1987 | Fed. Rep. of Germany . |
| 2252532 | 6/1975 | France . |
| 2359364 | 2/1978 | France . |
| 2441793 | 6/1980 | France . |
| 2570469 | 3/1986 | France . |
| WO86/01871 | 3/1986 | PCT Int'l Appl. . |
| 2038970 | 7/1980 | United Kingdom . |
| 1575944 | 10/1980 | United Kingdom . |
| 2174179 | 10/1986 | United Kingdom . |

*Primary Examiner*—Henry J. Recla
*Attorney, Agent, or Firm*—Leydig, Voit & Mayer

[57] ABSTRACT

A control assembly is described for controlling the flow of gas from a gas generating unit into a gas bottle to be charged. The bottle cannot be charged until a latch has been pushed clear by means of a button and until an operating lever has been moved into an unactuated position. The button is then released to latch the bottle and the operating lever is moved to the actuated position to close a micro-switch in series with a second micro-switch which is only closed when the neck of the bottle is properly inserted. These micro-switches electrically energize an ignition unit and gas generation starts. Gas passes through a bore in a piston and a pin carried thereby and initially escapes around the outside of the gas bottle neck thus purging contaminants. The piston and pin now commence to move under the action of the gas pressure and the distal end of the pin sealingly enters the bottle. Gas pressure opens a check valve in the bottle neck and charges the bottle. When peak pressure is reached, the check valve automatically closes. The operator then moves the operating lever to the unactuated position to open a depressurizing valve, allowing any still-present gas to pass to the underside of the piston, thus withdrawing the pin from the bottle neck. The latch button can now be depressed to enable the charged bottle to be removed.

28 Claims, 6 Drawing Sheets

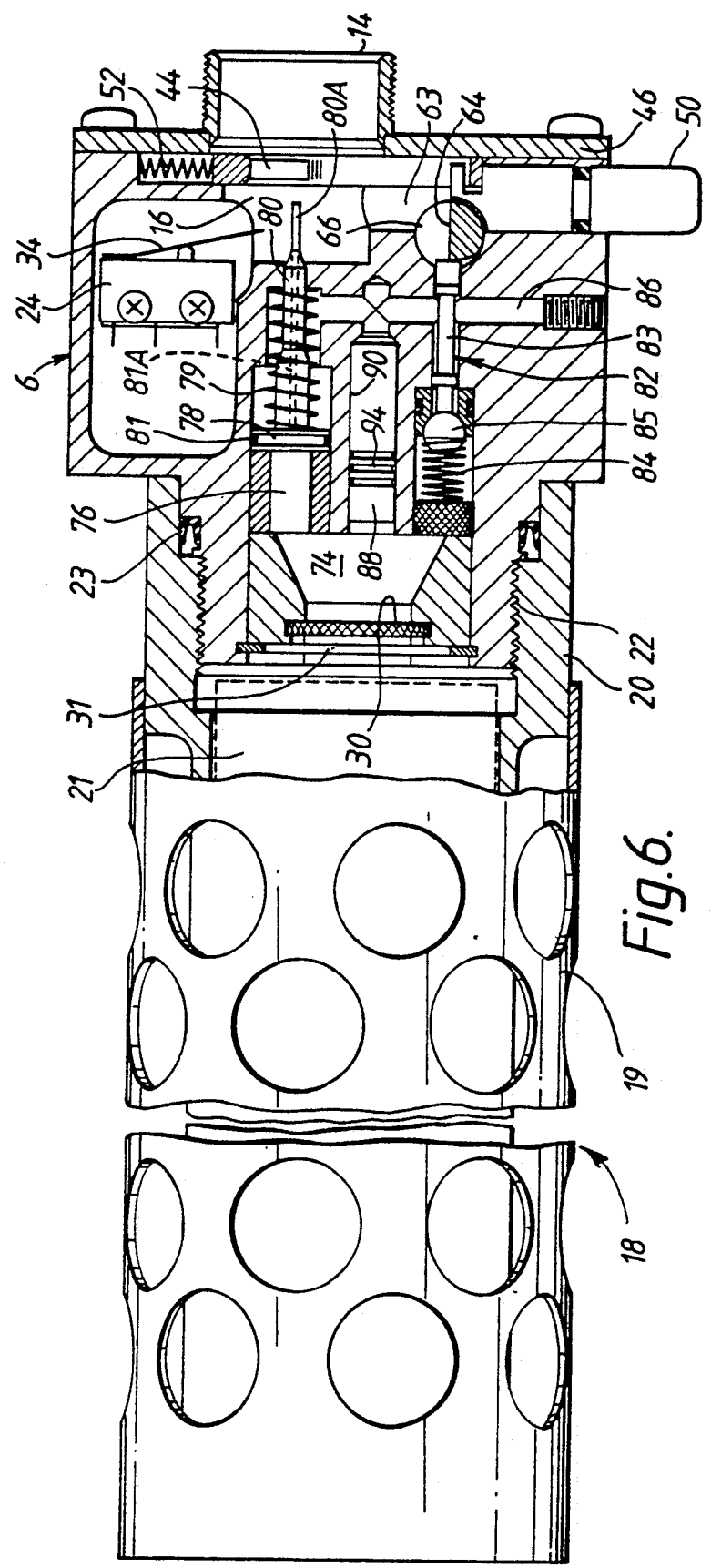
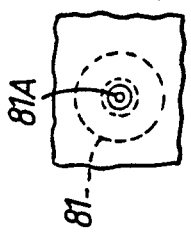
Fig.6.
Fig.7.

они
4,993,462

FLUID FLOW CONTROL ARRANGEMENT

BACKGROUND OF THE INVENTION

The invention relates to fluid flow control arrangements and more particularly to gas flow control arrangements for use in controlling the flow of gas into a gas bottle or reservoir to be charged with the gas.

BRIEF SUMMARY OF THE INVENTION

According to the invention, there is provided a gas flow control arrangement for controlling the flow of gas under pressure from a gas source into a gas reservoir to be charged, comprising receiving means for receiving a valved inlet portion of the gas reservoir, purging means for passing gas over the outside of the inlet portion of the gas reservoir for purging purposes, and control means responsive to the flow of gas under pressure from the gas source to cause the gas to pass sealingly into the interior of the inlet portion and to open the valve therein whereby the gas passes into and charges the reservoir.

According to the invention, there is further provided a gas flow control arrangement for charging a gas bottle from an electrically ignitable pyrotechnic gas source, the control arrangement comprising a recess for receiving the neck of the gas bottle which has an inlet in which is situated a pressure-responsive check valve, a piston-cylinder arrangement whose cylinder is connected to receive gas under pressure from the source and whose piston has a through bore communicating with a bore through a pin carried by the piston and which communicates with the interior of the recess whereby gas passing initially into the interior of the cylinder passes through the bores into the recess and exits to atmosphere over the outside of the neck of the bottle so as to purge away contaminants and thereafter, as the gas pressure builds up within the interior of the cylinder, the piston moves so as to transport the distal end of the pin sealingly into the inlet of the neck whereby the consequent build-up of pressure in the inlet opens the check valve and the gas enters into and charges the bottle, and an operating member operable by an operator to move into an actuated setting for electrically igniting the pyrotechnic gas source.

BRIEF DESCRIPTION OF THE DRAWINGS

A gas flow control arrangement embodying the invention will now be described, by way of example only, with reference to the accompanying drawings in which:

FIG. 6 corresponds to FIG. 3 but shows a modification;

FIG. 7 is a view of part of the assembly to an enlarged scale, looking in the direction of the arrow VII of FIG 3; and FIG. 8 corresponds to part of FIG. 3 but shows part of the gas bottle of FIG. 5 in position in the control assembly.

DESCRIPTION OF PREFERRED EMBODIMENTS

Figure 5:
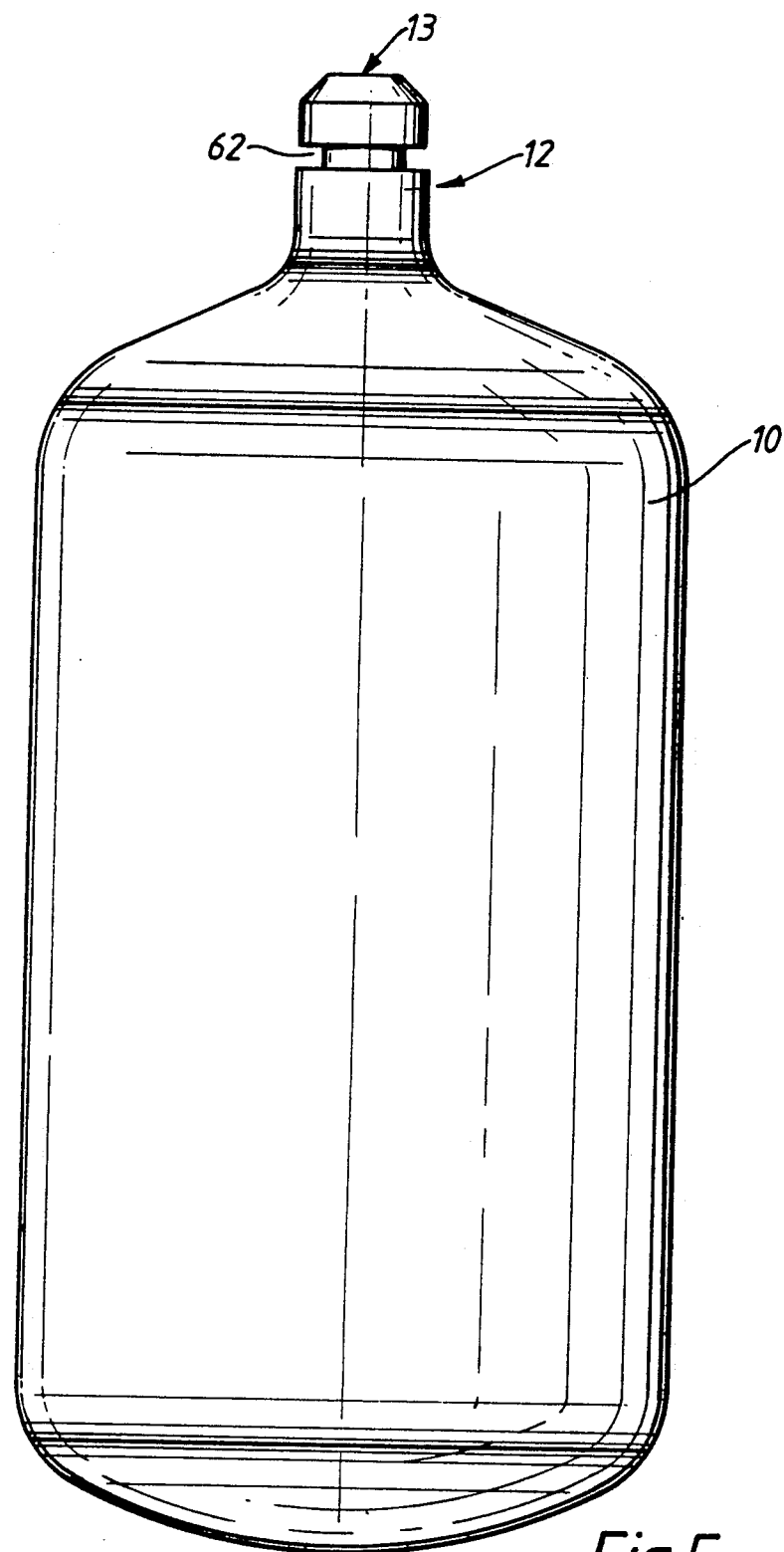
FIG. 5 is a side elevation of a gas bottle to be charged with gas by means of the control assembly.

The gas bottle 10 (FIG. 5), which is to be charged with gas using the control assembly to be described, has a narrowed neck 12 containing a check valve (not visible in FIG. 5 but shown at 12A in FIG. 8) which opens upon the application of external pressure exceeding a predetermined value so as to permit admission of the gas into the bottle via an inlet 13, and closes after removal of this pressure. During the charging operation, the gas bottle is fitted onto the control assembly 6 (see FIG. 3) by inserting its neck 12 into an appropriately sized opening 14 on the assembly. The end of the neck 12 locates in a recess 16 in the control assembly. The bottle is locked in position in the opening 14 in a manner to be described. FIG. 8 illustrates the neck 12 of the gas bottle in the locked position.

Figure 3:
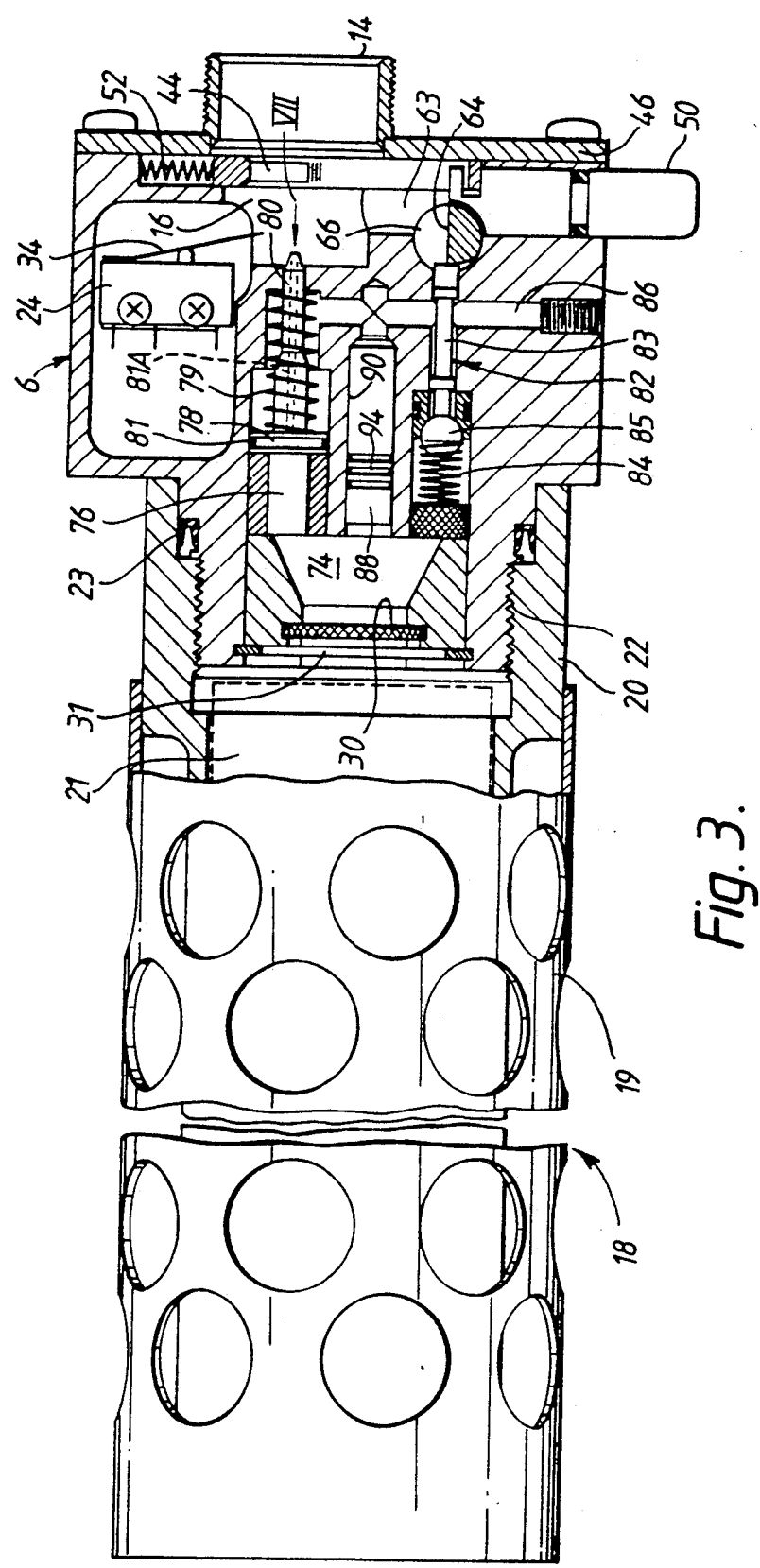
FIG. 3 is a longitudinal cross section through the assembly on the line III—III of FIG. 1 and showing a gas generating unit in position thereon.

In the application being described, the gas for charging the bottle 10 is generated in a gas generating unit 18 (see FIG. 3). The gas generating unit 18 may be of the form disclosed in copending United Kingdom Pat. Application No. 8608711 (Ser. No. 2174179). As diagrammatically shown in FIG. 3 herein, the gas generating unit 18 comprises a heat shield 19 enclosing a pressure can 20 into which is placed a cartridge 21 filled with the pyrotechnic gas generating composition. When this is activated by electrical ignition, by means of an ignition unit contained therein, it generates gas under high pressure which passes into and through a filter unit contained in the cartridge for removing particulate matter and moisture. In the manner to be described, the flow of gas from the unit 18 and into the bottle 10 is controlled by the control assembly 6. The pressure can 20 has an open end 21 which is screwed onto the end of the control assembly 6 by means of threads 22 and sealed by a circular seal 23.

Figure 1:
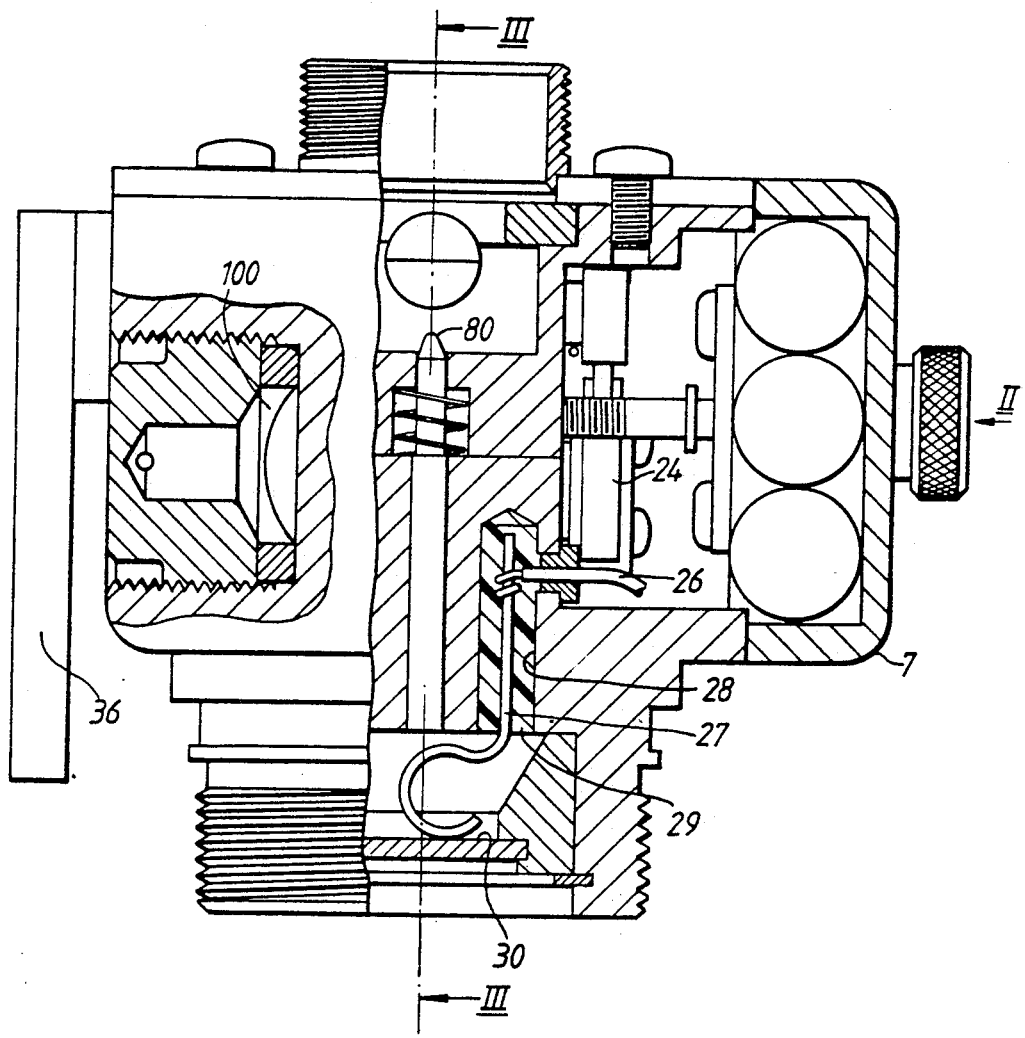
FIG. 1 is a partial cross-section through the assembly on the line I—I of FIG. 2 and showing a battery compartment 7 in position on the assembly.

The electrical supply for energising the ignition unit in the cartridge 21 and activating the pyrotechnic composition is derived from batteries (e.g. re-chargeable batteries) in a removable battery compartment 7 (see FIG. 1). The electrical supply path passes from one output terminal of the battery pack through a first micro-switch 24 (FIGS. 2 and 3), a second micro-switch 25 (FIGS. 1 and 2) and thence via a wire 26 and a connector 27 (FIG. 1), the connector passing through a bore 28 in the body of the assembly 6 and being insulated by insulation 29 (see FIG. 1). The end of the connector 27 engages a sintered metal cap 30 which makes electrical contact with the end of a central boss 31 surrounding the outlet of the cartridge 20 as shown dotted in FIG. 3. This outlet is normally closed by metal foil. The boss 29 is electrically conductive and insulated from the outer body of the unit 18 and therefore conducts the supply to one terminal of the ignition unit. The return supply line is via the metal body of the cartridge and the metal body of the assembly 6.

Figure 2:
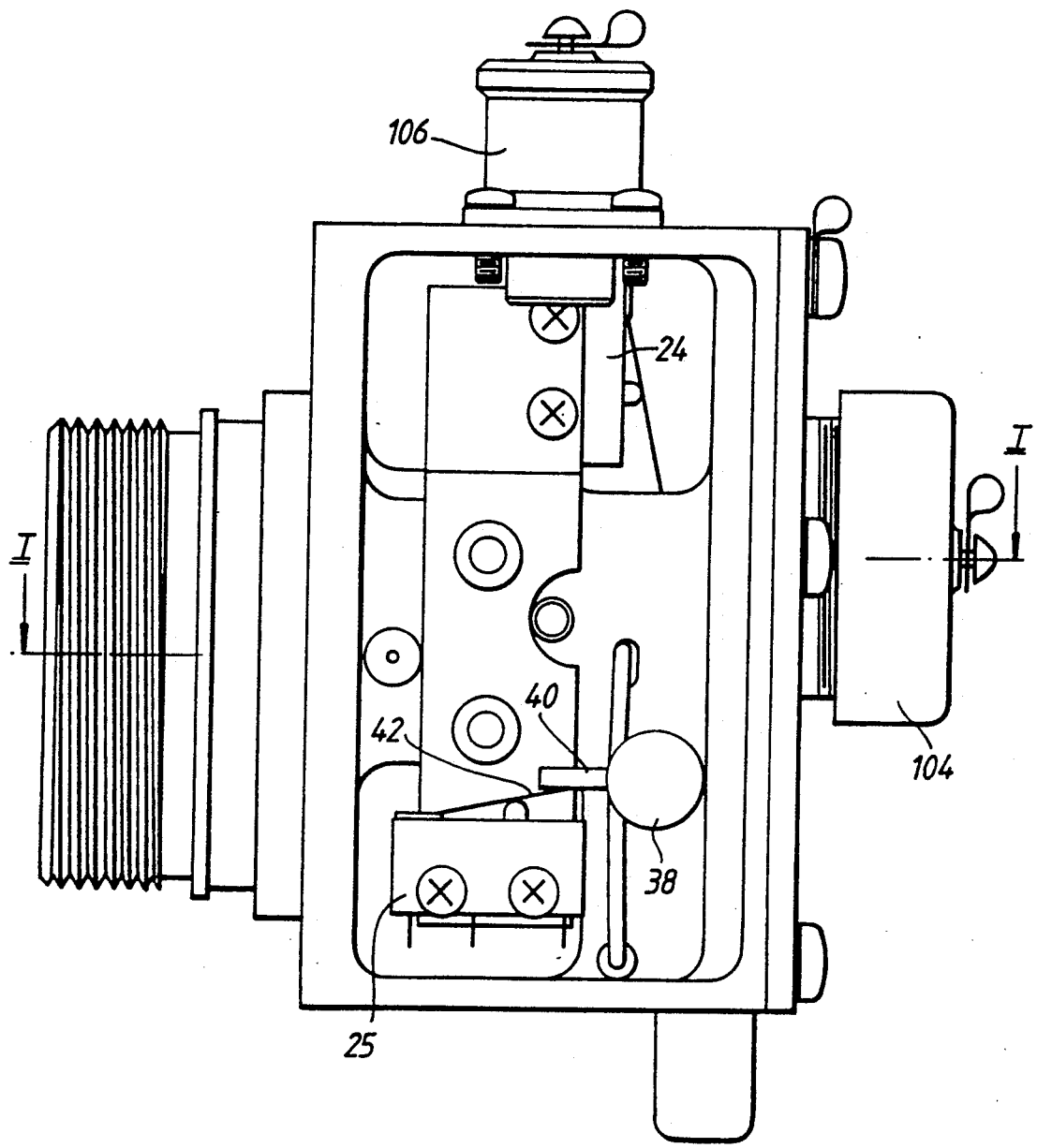
FIG. 2 is a view in the direction of the arrow II of FIG. 1 but with the battery compartment 7 removed.

Micro-switch 24 detects whether a gas bottle is in position on the assembly 6. The operating plunger 34 of the micro-switch protrudes into the recess 16 (see FIG. 3) and is thus depressed when the neck of the gas bottle is present and closes the switch. Micro-switch 25 is activated by rotation of an operating lever 36 (see FIG. 1). As shown in FIG. 2, the lever 36 rotates a spindle 38 carrying an arm 40 which engages a spring blade 42 on the micro-switch 25 so as to close the switch. Only when both micro-switches are closed is the circuit completed so that the ignition unit in the cartridge 20 is energised.

Figure 4:
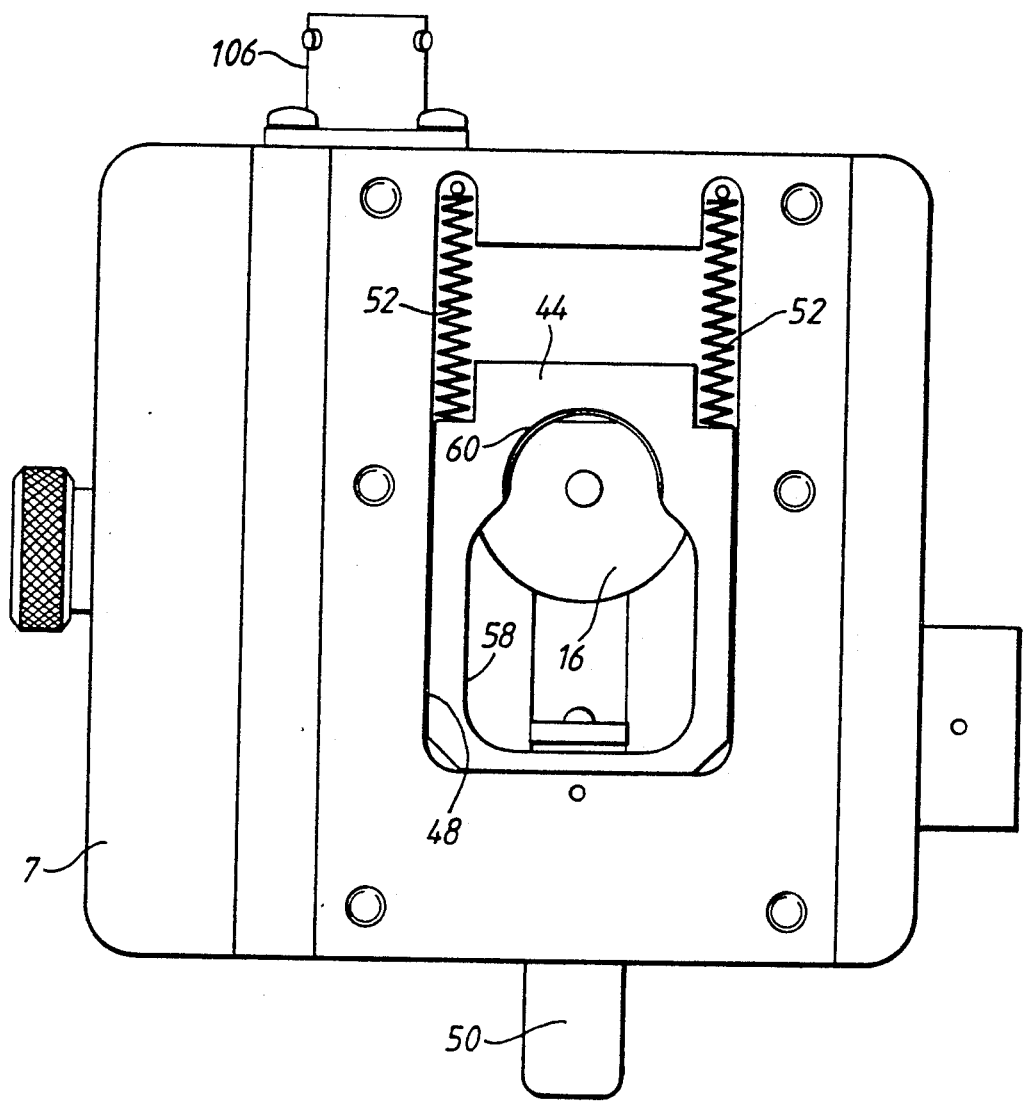
FIG. 4 is a view looking in the direction of the arrow IV of FIG. 3 but with a front cover plate removed.

The neck of the gas bottle is secured in position within the recess 16 by means of a slidable latch member 44. This is shown in FIG. 4 which is a view looking in the direction of the arrow IV of FIG. 3 but with the end plate 46 (FIG. 3) removed. The latch member 44 is slidable in a recess 48 by means of a push button 50 acting against two springs 52 (FIG. 4). In the position illustrated in FIGS. 3 and 4, the latch member 44 partially obscures the entrance to the recess 16, and the neck of the gas bottle cannot be inserted. In order to enable insertion of the neck of the gas bottle, the push button 50 has to be fully pushed home so as to move the latch member 44 upwardly (as viewed in FIG. 4). The neck of the gas bottle can therefore be inserted through the enlarged aperture 58 and pressed home into the recess 16. The button 50 is then released and the latch member 44 moves downwardly under the action of the springs 52 into the position illustrated in which the semi-circular edge 60 of the latch member engages the circumferential recess 62 (see FIG. 5) in the neck of the gas bottle, FIG. 8 showing the neck in this position.

However, the button 50 cannot be depressed (so as to permit insertion of the bottle neck into the recess 16) until the operating lever 36 is rotated from the position illustrated (the "activated" position) into the "unactivated" position, that is, the position in which the electrical supply to the ignition unit in the cartridge is held OFF because micro-switch 24 is not closed. This interlock arrangement is achieved by means of appropriate shaping of part of the spindle 38 of the operating lever. As shown in FIG. 3, the spindle passes partly through the bore 63 in which the button 50 slides. Where the spindle 38 passes through the bore 63, it is machined so as to be substantially (though not exactly) semi-circular in cross-section as shown at 64. As illustrated in FIG. 3, therefore, the spindle portion 64 prevents depression of the knob 50 when the handle 36 is in the activated position. The bottle cannot therefore be inserted.

In order to enable insertion of the bottle, the operating lever 36 has to be moved out of the activated position illustrated by turning it through 90° so as to rotate the spindle clockwise a viewed in FIGS. 2 and 3. The spindle portion 64 is thus withdrawn into its recess 66 and is now clear of the bore 63. At the same time, of course, micro-switch 24 is opened so as to open-circuit the supply from the batteries to the ignition unit in the cartridge 21. The operator can now depress the button 50 permitting insertion of the neck of the bottle into the recess 16 in the manner explained. The operator then releases the button 50 and the latch member 44 moves back into the position illustrated in FIG. 4 and locks the gas bottle in position.

The inserted gas bottle neck has now depressed the plunger 34 so as to close the micro-switch 24. In order to set gas generation into operation, therefore, the operator rotates the operating lever 36 through 90° in an anti-clockwise direction as viewed in FIGS. 2 and 3 so that the semi-circular portion 64 of the spindle moves back into position illustrated in FIG. 3. Further depression of the button 50 is thus not possible and prevents inadvertent removal of the gas bottle 16. At the same time, this anti-clockwise movement of lever 36 causes micro-switch 25 to be closed (see FIG. 2). The ignition unit in the cartridge is thus energised.

Energisation of the ignition unit causes pyrotechnic generation of gas which passes through the filter in the cartridge and its pressure ruptures the metal foil covering the outlet in the central boss 29 of the cartridge. The gas thus exits from the cartridge and passes through the sintered metal cap 28 (FIG. 3), which acts as a filter, and into a manifold chamber 74. From there, the gas passes into a cylinder 76 housing a piston 78 spring-loaded by a spring 79 and carrying a pin 80. The piston carries a sliding pressure-tight seal 81. A small bore passes completely through the piston 78 and axially through the pin 80 and has an exit at the end of the pin which protrudes into the recess 16. Gas passes through this bore and into the recess 16. At this stage, the check valve in the neck of the gas bottle is still shut and the escaping gas therefore passes around and over the external surface of the neck and thence to atmosphere through the entrance port 14, the neck not being a gas-tight fit within the recess 16. The purpose of this gas flow is to carry out a purging operation so as to remove any contamination (particulate or moisture and the like) which may be present within the recess 16 and/or on the external surface of the neck of the gas bottle. It is important to prevent any such contaminants from entering the bottle with the gas.

As the gas pressure continues to build up, it will eventually reach a level sufficient to move the piston 78 to the right (as viewed in FIG. 3) against the spring 79. The distal end of the pin 80 now advances further into the recess 16 and into the inlet 13 at the end of the neck of the gas bottle. The distal end is sized to be a gas-sealing fit at 13A within the inlet 13 and the issuing gas no longer escapes to atmosphere but now passes into the interior of the neck of the bottle. When the pressure has built up to a predetermined level, it is sufficient to open the check valve in the bottle neck and the gas now enters and charges up the gas bottle. There is no mechanical contact between the distal end of the pin 80 and the check valve. When the gas process is complete and the pressure of gas in the bottle has reached the peak value, there will no longer be sufficient pressure difference across the check valve to maintain it open and it will automatically close. The charged gas bottle is now ready for removal from the assembly 6. However, there will still be gas under pressure within the unit 18. In order to carry out a safe and controlled de-pressurising operation, a depressurising valve arrangement 82 is provided. In order to enable removal of the gas bottle, it is of course necessary for the operator to turn the operating lever 36 in a clockwise direction (as viewed in FIGS. 2 and 3) so as to rotate the spindle portion 64 into the recess 66, thus allowing subsequent depression of the button 50 (so that the latch member 44 permits removal of the bottle). As the operator commences to rotate the lever in the clockwise direction, the spindle portion 64 performs a camming action on a rod 83 (FIG. 3) and moves it to the left against a spring 84. This action opens the depressurising valve 82 by lifting a ball 85 off its seat and the gas under pressure which is still present within the unit 18 now passes from the manifold 74, through the opened valve 82, and into a bore 86. Bore 86 directs the gas into the interior of the cylinder 76 but on the right hand side of the piston 78. The gas thus assists the spring 79 in ensuring that the piston 78 and its pin 80 move to the left. The gas then escapes to atmosphere around the outside of the pin 80, into the recess 16, and around the outside of the neck of the bottle.

The operator continues to move the lever 36 in the clockwise direction until the spindle portion 64 lies fully within the recess 66. The operator can now depress button 50 and the latch member 44 permits removal of the now-charged gas bottle.

In order to guard against excessive pressure generation within the cartridge 20, two emergency release arrangements are provided. The first of these comprises a pressure relief arrangement 88 (see FIG. 3) comprising a bore 90 in which is situated pressure sensitive device 94. If the pressure becomes excessive, this permits the gas to pass into the bore 86. The escaping gas then escapes around the pin 80 and through the recess 16 and around the outside of the neck of the bottle in the manner already described. The second emergency release comprises a burst-disc arrangement 100 which is connected by a bore (not shown) to the manifold 74. Excessive pressures causes rupture of the burst disc and escape of the gas to atmosphere.

A cap 104 (FIG. 2) is provided for closing off the entrance port 14 when the assembly is not in use.

The batteries can be recharged via a recharging plug 106. This may also be used for providing an external electrical supply for energising the ignition unit in the cartridge 21 (again via the two micro-switches 24 and 25) instead of the batteries through suitable circuitry for protecting the batteries from the ignition current.

It will be apparent that the control assembly 6 provides an automatically controlled sequential operation in which, first, purging is carried out by the generated gas so as to remove all contaminants and, secondly, purging is stopped and gas charging of the gas bottle takes place. Furthermore, the fact that the check valve within the gas bottle is operated by gas pressure, and not by mechanical contact, means that the check valve closes automatically when the pressure difference across it becomes reduced to such an extent that gas might otherwise be drawn out of the bottle. The gas within the gas generating cartridge 21 will be at a relatively high temperature and will thus cool rapidly. If the check valve does not close sufficiently quickly and at the appropriate time, the effect of the rapidly cooling gas within the cartridge 21 could be to cause gas to be drawn back into the cartridge from the charged bottle, and this might occur if closure of the check valve depended on mechanical withdrawal of the pin 80.

Although the control assembly has been shown as controlling the charging of the gas bottle from a source of gas in the form of a pyrotechnically operating gas generating unit, it may of course be used to control the charging of a gas bottle from any other suitable sources of gas under pressure. If these do not require electrical activation, then the batteries and the micro-switches would not be needed.

The recess 16 (see FIG. 3) for receiving the neck of the gas bottle is shaped to receive bottles having necks of varying types.

A nominally empty gas bottle intended to be recharged in the manner illustrated and described above normally in fact contains some gas under low pressure. In a modification of the apparatus shown in FIG. 6, this gas can be used to carry out the initial purging. FIG. 6 corresponds to FIG. 3 and items in FIG. 6 corresponding to items in FIG. 3 are similarly referenced. As shown in FIG. 6, the pin 80 carries an extension 80A which engages and opens the check valve in the inlet 13 of the gas bottle. The extension 80A is a clearance fit in inlet 13 and opens the check valve before the gas pressure in the unit 18 has built up to the residual pressure within the bottle. Therefore, the residual gas in the bottle escapes round the extension 80A and provides the required purging action. Continued movement of the pin 80 causes the latter to enter fully the inlet 13 in a gas-tight manner so that the gas generated in the unit 18, which by now will have reached its full pressure, can enter and charge the bottle.

In another modification having the same effect, the pin 80 carrying the extension 80A is mechanically linked to the control lever 36 so that initial movement of the lever moves the pin forward and the extension 80A opens the check valve in the neck of the gas bottle. The low pressure gas still in the bottle thus escapes and carries out purging in the manner already explained, with the purging gas originating from the gas bottle and not from the gas generating cartridge 20. Continued movement of the control lever 36 electrically energises the ignition in the cartridge via micro-switch 25 and gas generation starts in the manner already described with the gas now pushing the pin so fully home into the neck of the bottle so as to ensure leak-free transfer of the gas into the bottle.

What is claimed is:

1. A gas flow control arrangement for controlling the flow of gas under pressure from a gas source into a gas reservoir to be charged, the gas reservoir having an inlet portion with an outer surface and including an inlet passage with a pressure-responsive valve therein.

the gas flow control arrangement comprising receiving means for receiving the inlet portion of the gas reservoir, purging means for passing gas over the outer surface of the inlet portion of the gas reservoir for purging purposes, and control means responsive to the flow of gas under pressure from the gas source to cause the gas to pass sealingly into the interior of the inlet portion of the gas reservoir such that it opens the valve in the inlet portion of the gas reservoir whereby the gas passes into and charges the reservoir, the purging means comprising means forming part of the control means and which is responsive to the initial flow of gas under pressure from the gas source to cause such gas to carry out the said purging purposes, the gas thereafter passing sealingly into the inlet portion.

2. An arrangement according to claim 1, in which the purging means comprises means for releasing gas at low pressure remaining in the gas reservoir to be charged, this released gas carrying out the said purging purposes.

3. An arrangement according to claim 1, in which
   the control means comprises a cylinder arrangement having piston means slidable therein,
   the cylinder is connected to receive gas under pressure from the said source, and
   the piston means has a through bore directing the gas into the receiving means for carrying out the said purging purposes,
   the piston means subsequently moving under the action of the pressure of the gas in the cylinder so as to mechanically seal with the interior of the inlet portion whereby to cause opening of the valve and charging of the reservoir.

4. An arrangement according to claim 3, comprising
   a first operating member movable by the operator between an activated position for actuating the gas source to produce the flow of gas and an unactivated position, an interlock arrangement preventing receipt of the inlet portion of the reservoir in the receiving means until the operating member is in the unactivated position, and de-pressurising means connected to be operated by movement of the first operating member to the unactivated position and comprising means for safe and controlled release of the gas remaining in the arrangement after charging of the reservoir has been completed and the said valve has closed, the de-pressurising means including means for directing the controllably released gas into the said cylinder such as at least to assist the piston means to move away from the inlet portion of the reservoir.

5. An arrangement according to claim 1, including a first operating member movable between an activated position for activating the gas source to produce the flow of gas and an unactivated position, and an interlock arrangement preventing receipt of the inlet portion of the reservoir in the receiving means until the operating member is in the unactivated position.

6. An arrangement according to claim 5, including a movable latching member and a second operating member for moving the latching member between a release position in which it allows free entry into and removal from the receiving means of the inlet portion of the gas reservoir and a latched position in which it latches the inlet portion in the receiving means if therein and blocks entry of the inlet portion into the receiving means if not therein, and in which the interlock arrangement comprises an interlock member mounted to move with the first operating member and positioned to block movement of the latching member from the latching position to the released position unless the first operating member is in the unactivated position.

7. An arrangement according to claim 5, including de-pressurising means connected to be operated by movement of the first operating member to the unactivated position and comprising means for safe and controlled release of the gas remaining in the arrangement after charging of the reservoir has been completed and the said valve has closed.

8. An arrangement according to claim 5, in which the source of gas is electrically activated, and including switch means operated by movement of the first operating member into the activated position for controlling electrical energisation for the source.

9. An arrangement according to claim 8, including further switch means sensitive to the presence of the inlet portion of the gas reservoir in the receiving means for preventing energisation of the said source until the inlet portion is so received.

10. An arrangement according to claim 1, including de-pressurising means for safe and controlled release of the gas remaining in the arrangement after charging of the reservoir has been completed and the said valve has closed.

11. An arrangement according to claim 1, in combination with said gas source and in which the gas source is an electrically ignitable pyrotechnic gas generating source.

12. A gas flow control arrangement in combination with a gas bottle to be charged from an electrically ignitable pyrotechnic gas source, the gas bottle having a neck which has an inlet portion with an outer surface and including an inlet passage in which is situated a pressure-responsive check valve, the control arrangement comprising means defining a recess for receiving the neck of the gas bottle, a piston-cylinder arrangement whose cylinder is connected to receive gas under pressure from the source, when the source is connected to the control arrangement, and whose piston carries a pin having a through bore communicating with a bore through the piston and which bores communicate with the interior of the recess, whereby gas passing initially into the interior of the cylinder passes through the bores into the recess and exist to atmosphere over the outer surface of the neck of the bottle so as to purge away contaminants, the piston being responsive to the subsequent gas pressure build-up within the interior of the cylinder so as to transport the distal end of the pin sealingly into the inlet of the neck of the gas bottle whereby the consequent build-up of pressure in the inlet opens the check valve therein and gas enters into and charges the bottle, and an operating member movable by an operator to move between an activated setting electrically igniting the pyrotechnic gas source when the gas source is connected to the control arrangement and an unactivated setting in which electrical ignition of the gas source is prevented.

13. An arrangement according to claim 12, including first interlock means for preventing electrical ignition unless the neck of the gas bottle is present in the said recess.

14. An arrangement according to claim 13, in which the first interlock means comprises a micro-switch in an electrical circuit controlling the electrical ignition, and means mounting the micro-switch so that it permits flow of current in said circuit only when mechanically actuated by the presence of the neck of the bottle in the recess.

15. An arrangement according to claim 12, including second interlock means preventing receipt of the neck in the said recess until the operating member is in the unactuated setting.

16. An arrangement according to claim 15, including a movable latch member, a second operating member connected to have the latch member between a release position in which it allows free entry into and removal from the recess of the neck of the gas bottle and a latched position in which it latches the neck in the recess if therein and blocks entry of the neck into the recess if not therein, and in which the second interlock means comprises an interlock member mounted to move with the first-mentioned operating member and positioned to block movement of the latch member from the latching position to the released position unless the first-mentioned operating member is in the unactuated position.

17. An arrangement according to claim 12, including means for depressurising the gas remaining in the arrangement after charging of the bottle has been completed and the said valve has closed.

18. An arrangement according to claim 17, in which the de-pressurising means is automatically operated by movement of the first-mentioned operating member to the unactuated position.

19. An arrangement according to claim 12, including pressure release means for automatically releasing excess pressure from the arrangement.

20. A gas flow control arrangement in combination with, and for controlling the flow of gas under pressure from a gas source into, a gas reservoir to be charged, the gas reservoir having an inlet portion with an outer surface and including an inlet passage with a pressure-responsive valve therein, the gas flow control arrangement comprising receiving means for receiving the inlet portion of the gas reservoir, purging means for passing gas over the outer surface of the inlet portion of the gas reservoir for purging purposes, and control means responsive to the flow of gas under pressure from the gas source to cause the gas to pass sealingly into the interior of the inlet portion of the gas reservoir such that it opens the valve in the inlet portion of the gas reservoir whereby the gas passes into and charges the reservoir, the purging means comprising means forming part of the control means and which is responsive to the initial flow of gas under pressure from the gas source to cause such gas to carry out the said purging purposes, the gas thereafter passing sealingly into the inlet portion, the control means comprising a cylinder arrangement having piston means slidable therein, the cylinder being connected to receive gas under pressure from the said source, and the piston means having a through bore directing the gas into the receiving means for carrying out the said purging purposes, the piston means subsequently moving under the action of the pressure of the gas in the cylinder so as to mechanically seal with the interior of the inlet portion of the gas reservoir whereby to cause opening of the valve therein and charging of the reservoir.

21. A gas flow control arrangement for controlling the flow of gas under pressure from a gas source into a gas reservoir which has a valved inlet portion with an outer surface and including an inlet passage with said valve therein and which is to be charged with the gas, the gas flow control arrangement comprising receiving means for receiving the inlet portion of the gas reservoir, purging means for passing gas over the outer surface of the inlet portion of the gas reservoir for purging purposes, and control means responsive to the flow of gas under pressure from the gas source to cause the gas to pass sealingly into the interior of the inlet portion and to open the valve therein whereby the gas passes into and charges the reservoir, the control arrangement also including a first operating member movable by an operator between an activated position for activating the gas source to produce the flow of gas and an unactivated position, a movable latching member, a second operating member for moving the latching member between a release position in which it allows free entry into and removal from the receiving means of the inlet portion of the gas reservoir and a latched position in which it latches the inlet portion in the receiving member if therein and blocks entry of the inlet portion into the receiving means if not therein, and an interlock arrangement comprising an interlock member mounted to move with the first operating member and positioned to block movement of the latching member from the latching position to the released position unless the first operating member is in the unactivated position, such that it prevents receipt of the inlet portion of the reservoir in the receiving means until the first operating member is in the unactivated position.

22. An arrangement according to claim 21, including de-pressurising means connected to be operated by movement of the first operating member to the unactivated position and comprising means for safe and controlled release of the gas remaining in the arrangement after charging of the reservoir has been completed and the said valve has closed.

23. An arrangement according to claim 21, in which the source of gas is electrically activated, and including switch means operated by movement of the first operating member in the activated position for controlling electrical energisation for the source.

24. An arrangement according to claim 23, including further switch means sensitive to the presence of the inlet portion of the gas reservoir in the receiving means for preventing energisation of the said source until the inlet portion is so received.

25. A gas flow control arrangement for controlling the flow of gas under pressure from a gas source into a gas reservoir which has a valved inlet portion with an outer surface and including an inlet passage with said valve therein and which is to be charged by the gas when it and the gas source are connected to the control arrangement, the gas flow control arrangement comprising receiving means for receiving the valve inlet portion of the gas reservoir, purging means for passing gas over the outer surface of the inlet portion of the gas reservoir for purging purposes, and control means responsive to the flow of gas under pressure from the gas source to cause the gas to pass sealingly into the interior of the inlet portion of the gas reservoir such that it opens the valve therein whereby the gas passes into and charges the reservoir, the control means comprising a cylinder arrangement having piston means slidable therein, the cylinder being connected to receive gas under pressure from the said source, and the piston means having a through bore directing the gas into the receiving means for carrying out the said purging purposes, the piston means subsequently moving under the action of the pressure of the gas in the cylinder so as to mechanically seal with the interior of the inlet portion whereby to cause opening of the valve and charging of the reservoir, a first operating member movable by an operator between an activated position for activating the gas source to produce the flow of gas and an unactivated position, an interlock arrangement preventing receipt of the inlet portion of the reservoir in the receiving means until the operating member is in the unactivated position, and de-pressurising means connected to be operated by movement of the first operating member to the unactivated position and comprising means for safe and controlled release of the gas remaining in the arrangement after charging of the reservoir has been completed and the said valve has closed, the de-pressurising means including means for directing the controllably released gas into the said cylinder such as at least to assist the piston means to move away from the inlet portion of the reservoir.

26. A gas flow control arrangement for controlling the flow of gas under pressure from an electrically activated gas source into a gas reservoir which has a valved inlet portion with an outer surface and including an inlet passage with said valve therein and which is to be charged by the gas, the gas flow control arrangement comprising receiving means for receiving the valved inlet portion of the gas reservoir, purging means for passing gas over the outer surface of the inlet portion of the gas reservoir for purging purposes, and control means responsive to the flow of gas under pressure from the gas source to cause the gas to pass sealingly into the interior of the inlet portion and to open the valve therein whereby the gas passes into and charges the reservoir, a first operating member movable by an operator between an activated position in which the gas source is activated to produce the flow of gas and an unactivated position, an interlock arrangement preventing receipt of the inlet portion of the reservoir in the receiving means until the operating member is in the unactivated position, and switch means operating by movement of the first operating member into the activated position for controlling electrical energisation of the source.

27. An arrangement according to claim 26, including further switch means sensitive to the presence of the inlet portion of the gas reservoir in the receiving means for preventing energisation of the said source until the inlet portion is so received.

28. A gas flow control arrangement in combination with an electrically ignitable pyrotechnic gas generating source and for controlling the flow of gas under pressure from the gas source into the gas reservoir which has a valved inlet portion with an outer surface and including an inlet passage with said valve therein and which is to be charged with the said gas, the gas flow control arrangement comprising receiving means for receiving the inlet portion of the gas reservoir, purging means for passing gas over the outer surface of the inlet portion of the gas reservoir for purging purposes, and control means responsive to the flow of gas under pressure from the gas source to cause the gas to pass sealingly into the interior of the inlet portion of the gas reservoir and to open the valve therein whereby the gas passes into and charges the reservoir.

* * * * *